No. 760,539. Patented May 24, 1904.

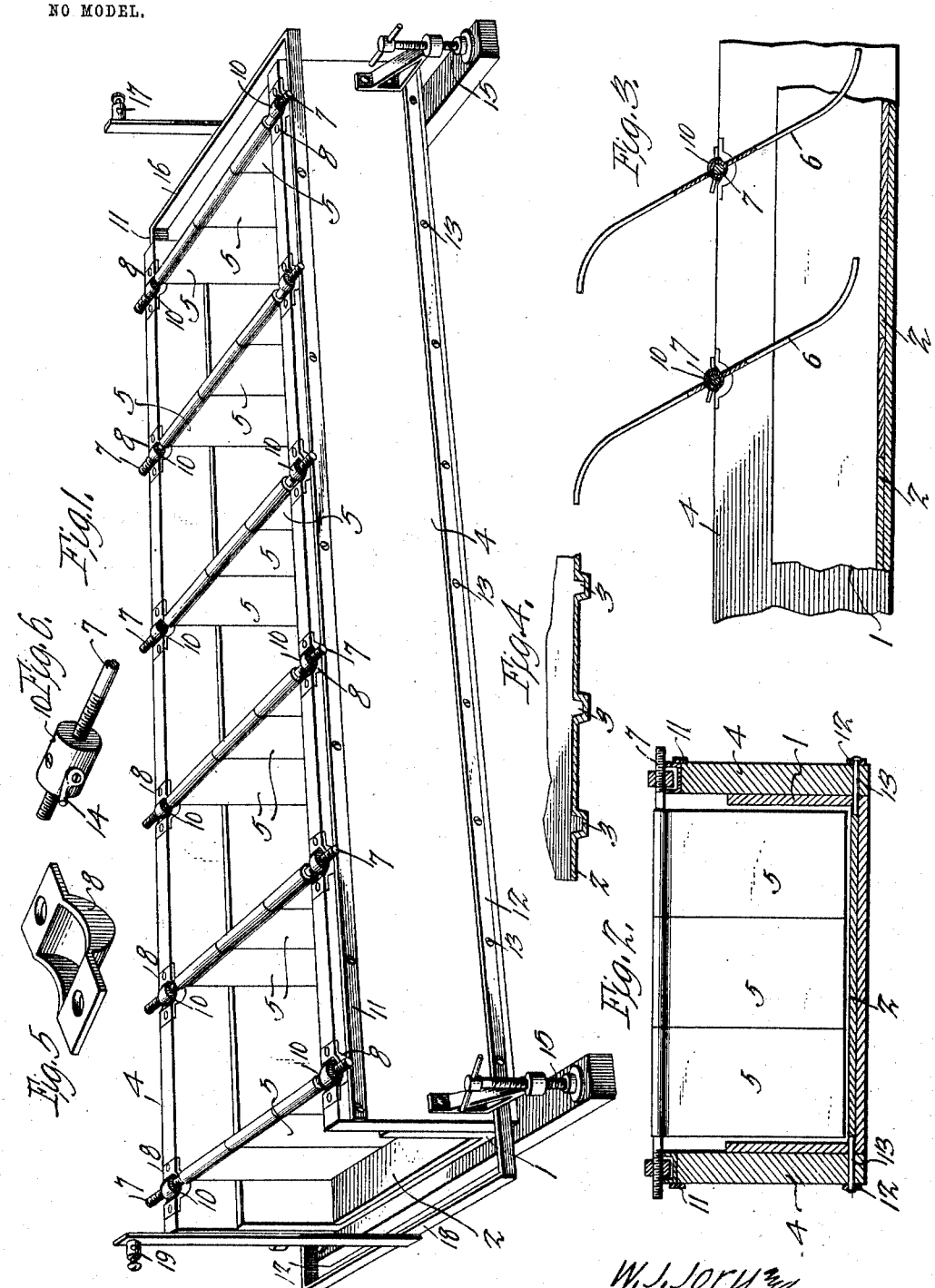

UNITED STATES PATENT OFFICE.

WILLIAM J. JORY AND JOSEPH H. JORY, OF SAN FRANCISCO, CALIFORNIA.

PROCESS OF RECOVERING METALS FROM ORES OR SANDS.

SPECIFICATION forming part of Letters Patent No. 760,539, dated May 24, 1904.

Application filed April 7, 1903. Serial No. 151,493. (No model.)

*To all whom it may concern:*

Be it known that we, WILLIAM J. JORY and JOSEPH H. JORY, citizens of the United States, residing at San Francisco, in the county of San Francisco and State of California, have invented a new and useful Process of Recovering Metals from Ores or Sands, of which the following is a specification.

This invention relates to processes for recovering metals from ores or sands in which they may be found, and comprises in its most comprehensive form improvements in the mode of preparing ores for the action of chemical and electrical agencies for extracting metals therefrom and in modes of procedure in selecting and applying chemical and electrical agencies to the suitably-prepared ores for the purpose of extracting the metals contained therein.

Generally speaking, the process may be described as an improvement on the amalgamation process for separating metals from their ores; and it has for its object to provide a process with various modifications adapted to ores of different metals whereby metals of many different kinds may be recovered substantially without loss from the ores or sands in which they are found. In accomplishing this object the process may sometimes be employed in its entirety upon ores of certain kinds or with those of other kinds presenting less difficulty in treatment, or with sands in which metal is present in its native state the process may be used in somewhat fragmentary form, certain steps being unnecessary.

In describing the process the treatment of sands in which metal is present in the native state will be first disclosed, then the treatment required for recovering metals from the simpler ores, and finally the procedure required in treating more complex and refractory ores, together with the disclosure of some of the different modifications of the process as employed with certain special ores.

In the recovery of gold from sands as heretofore practiced amalgamating-plates have sometimes been used to retain the finer particles of the metal, and in addition thereto metallic mercury has been introduced into the flow of water carrying the sand or has been placed upon the amalgamating-plates for the purpose of amalgamating the gold and retaining the same. In order to make the amalgamation process of extracting gold from sands more effective than heretofore, and thereby to prevent loss of a considerable percentage of the metal contained in the sands, we impose an electric current upon the flow of water containing the gold, using for the purpose an electrolytic deposition apparatus, the construction of which is fully disclosed in subsequent paragraphs of this specification and illustrated in the drawings forming a part hereof, in which—

Figure 1 is a view in perspective of deposition apparatus constructed in accordance with the present invention. Fig. 2 is a view in transverse section. Fig. 3 is a view, partly in elevation and partly in section, of a slightly-modified form of a portion of the apparatus. Fig. 4 is a detail view of a slightly-modified form of bottom for the apparatus. Fig. 5 is a perspective detail view of one of the supports or bearings for the shafts of the electrodes. Fig. 6 is a detail view in perspective of an end of one of the electrode-shafts with a collar for maintaining electrical contact with the mercury contained in the bearings for the shafts.

The apparatus consists of a trough-like table 1, which is to be of such capacity that the flow of the solution—the water carrying metals in suspension accompanied by sands or any other fluid holding the metals to be recovered—shall form a shallow stream, while flowing at such a rate as to carry off the sands contained in the fluid. At the bottom of this trough is laid a plate or plates 2, of copper, silvered copper, or other suitable metal, fitting closely to the sides thereof and extending from end to end of the table. The surface thus presented may be plain or corrugated, according to the character of the work to be done, and constitutes one pole of the apparatus. In some instances the bottom of the apparatus may be provided with riffles or depressions 3, as shown in Fig. 4, to contain mercury, the riffles being electrically connected to constitute the electrodes of the apparatus. Secured to the sides of the table are two supports 4, constituting a frame upon which are supported electrodes 5, which may be of the form shown in Fig. 1 or that shown in Fig. 3. These electrodes may be made of any suitable metal or of carbon or of any conducting fabric, either rigid or flexible, and are secured to the metallic or carbon bars 7, mounted for rocking movement in bearings 8 on the upper edges of the frame 4. Instead of connecting the electrodes rigidly with the shafts or bars 7 these may be loosely mounted to swing thereon, as shown in Fig. 3. Each of the shafts 7 carries near each end a collar 10, as shown in detail in Fig. 6, the collars being held upon the shafts by set-screws or other equivalent form of fastening device. The collars work in bearings 8, the bearings, in effect, constituting sockets to present receptacles for mercury, thus at once lessening the friction of the bearing and forming an electric conductor.

Extending along both sides of the exterior of the frame near its upper edges and in contact with the bearings 8 are copper rods 11, said rods forming a means by which the electric current is conveyed to the electrodes, and extending along both sides of the exterior of the frame near its lower edges are copper rods 12, which are electrically connected with the copper plates 2 by set-screws 13, which pass through the rods 12 and into the plates, these latter rods operating to convey an opposite electric current into the plate-electrodes 2. The suspended electrodes 5, as shown in Figs. 1 and 2, may be replaced by electrodes 6, as shown in Fig. 3, which are balanced to present but slight obstruction to the passage of sands and the like contained in the flow of liquid and are adapted to be reversed when their lower parts have become so worn, abraded, corroded, or overweighted as to become unserviceable. The collars 10 are each provided with one or more adjustable stops 14, which may be set to prevent the electrodes from coming into such close proximity to the plate-electrodes 2 or the riffle-electrodes 3 in the bottom of the trough as to make a short-circuit or, on the other hand, from swinging so far above the plate-electrodes as to lower the efficiency of the apparatus.

At each corner of the table is placed an adjusting-screw 15, by which the level of the apparatus may be changed to give it the greatest possible efficiency by increasing or diminishing the rate of flow to carry off the lighter or heavier sands of the various ores or to cause a greater or less flow of the fluids being acted upon by the electric current.

In using the electrolytic apparatus above described in addition to the metallic mercury placed in the sands, as in the process heretofore practiced, for the purpose of amalgamation we introduce also sodium chlorid or some other soluble sodium salt in such quantity that the electric current passing through the flow between the swinging and stationary electrodes will produce on the amalgamating-plates combined sodium and mercury, forming a sodium amalgam, or if the electric current be properly adjusted in voltage and current strength to decompose a small portion of the water present in the flow a hydrogen-sodium amalgam will be produced which is of the highest amalgamating power, capable not only of amalgamating the gold present in the flow, but also platinum and other valuable metals that cannot be amalgamated by any other means.

In other processes hitherto practiced to extract gold from ores in which the ore is first crushed in a stamp-battery or other similar apparatus and the metallic contents of the ores afterward recovered by amalgamation metallic mercury has been introduced into the mortars of the stamp-batteries with the ore while the process of pulverization was in progress. By this method better results are obtained than by afterward mixing the metallic mercury with the pulverized ore, as a more intimate mixture of the mercury with the fine particles of ore and metal was thus obtained; but a more effective mode of procedure still is that employed by us, which consists in introducing along with the metallic mercury a solution of sodium chlorid or other soluble sodium salt, so that the pulverized ore with the admixture of sodium chlorid which may be carried directly from the mortar through the screens and onto the amalgamating-tables by a current of water and there be subjected to electrolytic amalgamation, so producing a hydrogen-sodium amalgam in the manner explained in the preceding paragraph. This course of procedure is more effective than the old one and is satisfactory except in the treatment of ores from which much slime is produced by the action of the stamp-batteries. In the treatment of such ores it is advantageous to introduce into the mortars instead of metallic mercury a solution of a salt of mercury mercuric (chlorid being a suitable one) in such quantities as may be calculated to produce an amalgam of the proper consistency when deposited on the amalgamating-plates together with the contents of the ores, and at the same time there should be introduced into the mortar some soluble sodium salt other than the chlorid in order to produce by the action of the electrolytic accumulator when pulp from the stamp-batteries is passed through it a hydrogen-sodium amalgam, as already explained. It is possible to secure a much more intimate contact of the solution of a salt of mercury with the fine particles of ore present in the slimes than can be obtained between metallic mercury and the particles in the slimes. Consequently the action of the electrolytic apparatus upon the pulp from the stamp-batteries is effective in recovering larger quantities of metal from the ores thus treated than from those treated by the old method.

The above processes comprise the steps necessary in the treatment of simple ores of gold and silver or of those metals together with platinum and other metals allied to its group, and of course sands containing these metals may also be handled in the same way; but for more complex ores of gold and silver and for ores of copper, mercury, tin, antimony, and lead there should be employed a combination of mechanical pulverizing agencies and chemical solvents or other chemical reagents for leaching the pulp obtained from the pulverizing apparatus previous to the action of the electrolytic apparatus. In some instances it may be possible to introduce chemical reagents into the pulverizing apparatus and make the chemical action of the reagents and the mechanical action of the pulverizing apparatus simultaneous, so obviating the leaching process subsequent to the pulverization of the ore. In other cases the action of the reagent may be advantageously begun while the pulverization is in progress, but must be completed by subsequent leaching in suitable tanks provided for that purpose.

In gold-milling as heretofore conducted the ore was placed in the mortar of the stamp-battery, and during the operation of stamping a stream of water, more or less pure, was introduced to produce a flow which carried the pulp from the battery through the screens and over the amalgamating-tables and also into the vats in those cases in which lixiviation was practiced, the water being drawn out of the vats before the solvent was introduced. As improvements upon this operation we introduce directly into the mortar or other mechanical pulverizer certain chemicals adapted to act upon the ores to aid in the ultimate formation of a solution containing the metals in such form that they may be readily recovered therefrom by the electrolytic means hereinbefore mentioned. The reagents introduced will vary with the nature of the ores to be treated and may be divided into three different classes. The first class comprises reagents which act directly upon the ores to dissolve the metals contained therein. The second class comprises reagents which combine with the constituents of the ore other than the metals to be recovered to form solvents for the metals, and the third class consists of reagents which are adapted to form, with or without combination with other constituents of the ores, solutions of the metals which after electrolytic decomposition will yield reagents adapted to recombine with some of the constituents of the ore to form solvents for the metals.

The advantage of bringing chemicals into the pulverizing apparatus and there subjecting the ores to the action of the chemicals instead of completing the pulverization and then introducing the chemicals with the pulp into a leaching-vat is that time is saved by carrying on the chemical action and mechanical action simultaneously and much more intimate contact of the reagents with the ores is obtained than when the ores are merely allowed to stand in the presence of the reagents, as in a leaching-vat. This is especially true of those ores from which much slime is produced in the stamping process.

If the ore is of such character that complete action of the reagent upon the ore may be brought about during the time required for the stamping process, the pulp, together with the chemical solution, may be allowed to flow out of the mortar when the ore has been crushed to the desired fineness and passed directly through the electrolytic apparatus, in which the various metals present may be deposited simultaneously as an alloy if the potential and strength of the current employed be sufficient. By employing a series of deposition-tanks and adjusting the currents through them in a way that may be readily calculated by any skilled metallurgical chemist the metal most easily deposited will be found in the tank through which the flow passes first, and the others may be separately deposited in the succeeding tanks, which of course should be arranged to deposit the metals successively in the order of the facility with which they may be obtained from the flow. In case the time required to effect a solvent action of the chemical reagent upon the ores is greater than that occupied in effecting pulverization the pulp and solvent should be run into vats or tanks provided with filtering-beds, in which the mixture is allowed to remain long enough for the action of the reagents to be complete, and the solution is then drawn off through the filtering-bed and conducted through the electrolytic apparatus. In case the ore contains metallic particles too large to be completely dissolved by the chemical reagents either in the stamping process or in the leaching-vats afterward the particles will be kept on the amalgamation-plates by the hydrogen sodium amalgam before described the mercury being introduced into the ore in either of the forms already described, which may be most suitable to the ore under treatment and sodium being introduced in the form of the chlorid or other soluble salt, care being taken to use a salt of sodium which will produce no interfering reactions upon the other substances present.

The quantity of the reagent for effecting solution employed in this process is much larger for a unit of ore than heretofore employed in leaching processes, and therefore produces a thorough solution of the metals to be extracted and accomplishes its work with much greater rapidity than heretofore without making any increase in the number or size of the leaching-tanks necessary.

In the application of chemical reagents for the purpose of forming solutions of the metallic contents of the ores the method pursued is as follows: A chemical analysis is first made of the ore to be operated upon and a reagent is chosen of that one of the three classes previously mentioned which analysis shows is adapted to produce the most satisfactory results. In some cases it would be advantageous to employ a reagent of class 1, which is itself a solvent of the metal in the form in which it is present in the ore. In others a reagent of class 2 will be employed, which while not in itself a solvent for the metal will combine with some of the other constituents of the ore to form a solvent for it. In still other cases, especially in those in which a sort of cycle of operations is possible by which the reagent may be recovered and used again, it will be advantageous to employ a reagent of class 3, which is adapted to form solutions of the metal present which upon electrolytic decomposition yield a product which is adapted to recombine in with the other constituents of the ore to regenerate the solvent originally introduced. In all of the cases above mentioned the action of the solvent is increased by introducing it into the mortar of the stamp-battery and subjecting the ores simultaneously to the action of the reagent and the mechanical effect of the stamp-battery.

As examples of the procedure above outlined the following are given to show more clearly the exact nature of the operation under different circumstances. When upon analysis we find a gold ore containing copper and iron present as sulfids of those metals, or a copper-sulfid ore containing gold and a ferric sulfid, we introduce into the pulverizing apparatus with the ore a solution of sulfuric or other single acid in such quantity as will effect the purpose desired, the quantity of acid for a given quantity of ore being determined from the quantitative analysis of metal to be extracted from the ore and the computation of the reactions necessary to procure such extraction. The acid so introduced will act upon ferric sulfid to produce a solution of ferric sulfate, which, under the conditions stated, is an effective solvent of both copper and gold contents of the ore. In case the ore is one containing gold, arsenic, and antimony, in connection with sulfur combined with this or other metals, we introduce into the ore when placed in the pulverizing apparatus a solution of ammonium sulfid. The reaction that then takes place between the reagent and the arsenic or antimony forms a solution that dissolves the gold present in the ore and keeps it in solution. In treating a silver ore containing copper and silver sulfids we use as a reagent in some cases a sulfite of some alkaline earth or alkali metal, preferably sodium hyposulfite, to which we add during the process of pulverization a solution of ammonia in such quantities as will produce a decided alkaline reaction. The splash of the stamps during the pulverization process causes oxygenation of the solution, which aids in producing an energetic solvent which first combines with the copper and then dissolves the silver and holds it in solution. The oxygenation of the solution also prevents the formation of ammonium sulfid, which would precipitate both of these metals. In case the ore contains mercury, tin, antimony, lead, and various other metals to which this example applies when sulfur is present in any of the ores, either in combination with the metals named or with others, a sulfid of an alkaline earth or a sulfid of an alkali metal, preferably sodium sulfid, is employed as the reagent. This chemical is given an alkaline reaction by the introduction into this solution of a caustic alkali of the metal forming the base of the soluble sulfid, which is then introduced into the pulverizing apparatus with the ore to be operated upon, or, the ore having been crushed in a dry state, the solvent, as above described, is introduced with the ore into a leaching-vat and leaching carried on in the usual manner. The combined chemicals so introduced react on the sulfur in the ore, causing it to continuously remain at its highest power as a solvent of the ores and their combinations, and during the operation of the electrolytic accumulator the deposition of the metals present upon the cathodes causes the regeneration of the solution to its former state as a reagent, the sodium deposited on the cathodes recombining with the water in the flow to form a sodium hydrate, and the sodium sulfid being kept at its highest power as a solvent by the sulfur obtained from the ore.

In the recovery of mercury from ores it has hitherto been the practice to employ a system of distillation in retorts or furnaces—an operation very imperfect in itself and injurious to the health of the persons performing it. As an improvement on this process we employ a process including the pulverization of the ore in contact with suitable chemical reagents and solvents, as above described in connection with other ores, the reagent most preferred being the sulfid of an alkaline metal to which has been added a hydrate of the same metal in sufficient quantity to produce an alkaline reaction of the solution. The ore pulp, together with the solvent, having been run into tanks provided with filtering-beds is allowed to remain therein until the mercury has entered into solution. The solution is then filtered from the refuse and passed through an electrolytic apparatus of suitable form wherein the metal is deposited. The mercury adheres but slightly to the cathode-plates of the accumulator, and consequently is carried onward by the force of gravity with the flow through the apparatus and passes into a receptacle prepared for its reception. The solution exhausted of its mercury contents flows over the receptacle for the mercury and through a conduit into the sump, from which it is pumped and again set in circulation as a continued solvent, so that the process forms a continuous cycle or circuit of operations. The receptacle into which the mercury flows is an iron tank electrically connected to form a cathode and has a perforated anode near the top, so preventing the tendency of the exhausted solution to dissolve the mercury with which it is in contact in the mercury-receptacle.

What is claimed is—

1. The process of extracting noble metals from their ores, comprising simultaneous pulverization of the ores and treatment with reagents adapted to combine with less valuable constituents of the ores to form a solvent for the noble metals.

2. The process of extracting noble metals from their ores, comprising simultaneous pulverization of the ores and treatment with reagents adapted to form, by combination with less valuable constituents of the ores, solvents which will combine with the noble metals to form salts which, under electrolytic action, will be decomposed with the regeneration of the solvent.

3. The process of extracting noble metals from their ores, comprising the treatment of ores of suitable composition with ammonium sulfid, simultaneously pulverizing said ores by mechanical means and subsequently depositing the noble metals from solution by means of electrolysis.

4. The process of extracting noble metals from their ores, comprising the treatment of the ores with an alkaline sulfid solution together with the hydrate of the metal forming the base of the sulfid, simultaneously pulverizing said ores and subsequently depositing the noble metals from solution by electrolysis.

In testimony that we claim the foregoing as our own we have hereto affixed our signatures in the presence of two witnesses.

WILLIAM J. JORY.
JOSEPH H. JORY.

Witnesses:
  BLANCHE C. SMALL,
  A. W. SMALL.